(12) United States Patent
Iorio et al.

(10) Patent No.: US 10,686,361 B2
(45) Date of Patent: Jun. 16, 2020

(54) SYNCHRONOUS RECTIFIER GATE DRIVER WITH ACTIVE CLAMP

(71) Applicant: STMICROELECTRONICS S.R.L., Agrate Brianza (IT)

(72) Inventors: Alberto Iorio, Aosta (IT); Maurizio Foresta, Aosta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/355,649

(22) Filed: Mar. 15, 2019

(65) Prior Publication Data
US 2019/0214898 A1 Jul. 11, 2019

Related U.S. Application Data

(63) Continuation of application No. 15/855,277, filed on Dec. 27, 2017, now Pat. No. 10,277,107.

(51) Int. Cl.
*H02M 1/08* (2006.01)
*H02M 3/335* (2006.01)
*H02M 3/337* (2006.01)
*H02M 1/00* (2006.01)
*H02M 1/34* (2007.01)

(52) U.S. Cl.
CPC ......... *H02M 1/083* (2013.01); *H02M 3/3376* (2013.01); *H02M 3/33592* (2013.01); *H02M 1/34* (2013.01); *H02M 2001/0058* (2013.01); *H02M 2001/342* (2013.01)

(58) Field of Classification Search
CPC ...... H02M 1/083; H02M 7/217; H02M 3/335; H02M 2001/0058; H02M 1/34; H02M 3/33569; H02M 3/33507; H02M 3/33592; H02M 3/33546; H02M 3/33523; H02M 2001/342; H02M 2001/344; H02M 2001/0009; Y02B 70/1491; Y02B 70/1475; Y02B 70/1433
See application file for complete search history.

(56) References Cited

U.S. PATENT DOCUMENTS

| 5,636,116 | A | 6/1997 | Milavec et al. |
| 6,239,989 | B1 | 5/2001 | Ming-Ching |
| 6,262,905 | B1* | 7/2001 | Zhang ............... H02M 7/217 323/225 |
| 6,373,731 | B1* | 4/2002 | Iwamura ............ H02M 1/34 361/91.1 |
| 9,788,369 | B2* | 10/2017 | Huang ............... H05B 45/395 |
| 2006/0062026 | A1* | 3/2006 | Wittenbreder, Jr. .......... H02M 3/1588 363/21.06 |
| 2006/0109693 | A1 | 5/2006 | Kyono |
| 2006/0139968 | A1 | 6/2006 | Tsuruya et al. |
| 2006/0268585 | A1 | 11/2006 | Domb et al. |

(Continued)

*Primary Examiner* — Gustavo A Rosario-Benitez
(74) *Attorney, Agent, or Firm* — Seed IP Law Group LLP

(57) ABSTRACT

Various embodiments provide a resonant converter that includes a synchronous rectifier driver. The synchronous rectifier driver reduces voltage spikes on drains of transistors within the resonant converter by placing an active clamp between the drains of the transistors and an output terminal of the resonant converter. The active clamp reduces the voltage spikes by sinking current at the drains of the transistors to an output capacitor. By sinking the current to the output terminal, power loss is minimized and efficiency of the resonant converter is improved.

13 Claims, 7 Drawing Sheets

(56) References Cited

U.S. PATENT DOCUMENTS

| | | |
|---|---|---|
| 2010/0315839 A1 | 12/2010 | Yang et al. |
| 2011/0090724 A1 | 4/2011 | Appelberg |
| 2012/0127762 A1* | 5/2012 | Reddy ............... H02M 3/33592 363/21.04 |
| 2013/0043912 A1 | 2/2013 | Chui et al. |
| 2013/0154492 A1 | 6/2013 | Summerland |
| 2014/0133200 A1 | 5/2014 | Sun et al. |
| 2015/0381075 A1* | 12/2015 | Qu .................... H02M 3/33576 363/132 |
| 2016/0029448 A1 | 1/2016 | Huang et al. |
| 2016/0043647 A1 | 2/2016 | Rapisarda et al. |
| 2016/0218627 A1 | 7/2016 | Dikken et al. |
| 2017/0033703 A1 | 2/2017 | Kikuchi et al. |

\* cited by examiner

SYNCHRONOUS RECTIFIER GATE DRIVER WITH ACTIVE CLAMP

BACKGROUND

Technical Field

The present disclosure is directed to a synchronous rectifier driver for resonant converters and other topologies.

Description of the Related Art

In general, resonant converters convert an input voltage having a first voltage level to an output voltage having a second voltage level, and regulate the output voltage for a load. Resonant converters are typically used for powering electronic devices, such as displays for televisions, computers, and mobile devices. Resonant converters are highly efficient and have become increasingly popular for applications with power constraints, such as battery operated devices.

Many resonant converters include a rectifier that utilizes a plurality of transistors to convert an alternating current (AC) signal to a direct current (DC) signal. Voltage spikes are often generated on drains of the transistors and may sometimes damage the resonant converter. These voltage spikes may be caused for a variety of reasons, such as current inversion due to a delayed turn-off of the rectifier and the resonant converter operating above resonance and the transistors' body diode recovery time.

BRIEF SUMMARY

The present disclosure is directed to a resonant converter that includes a synchronous rectifier driver. The synchronous rectifier driver reduces voltage spikes on drains of transistors within the resonant converter by placing an active clamp between the drains of the transistors and an output terminal of the resonant converter. The active clamp reduces the voltage spikes by sinking current at the drains of the transistors to the output terminal of the resonant converter. In addition, by sinking the current to the output terminal, power loss is minimized and efficiency of the resonant converter is improved.

According to one embodiment, the resonant converter includes an input terminal, an output terminal, a switch network, a resonant tank, a transformer, a rectifier, and an output capacitor. The switch network is a half bridge that receives an input voltage at the input terminal, generates a square wave using the input voltage, and provides the square wave to the resonant tank. The resonant tank receives the square wave signal generated by the switch network and generates an alternating current (AC) signal based on the square wave signal. The transformer receives the AC signal from the resonant tank on a primary side of the transformer and transfers the AC signal to a secondary side of the transformer. The rectifier receives the signal from the secondary side of the transformer, converts the AC signal to a direct current (DC) signal, and provides the DC signal to the output capacitor. The output capacitor is electrically coupled to the output terminal. The output capacitor ensures that an output voltage remains stable and properly regulated for a load.

According to one embodiment, the rectifier includes a first transistor, a second transistor, and a synchronous rectifier driver with an active clamp. The synchronous rectifier driver includes a first input that is electrically coupled to a drain of the first transistor, a second input that is electrically coupled to a drain of the second transistor, a first output that is electrically coupled to a gate of the first transistor, a second output that is electrically coupled to a gate of the second transistor, and a third output that is electrically coupled to the output capacitor. The active clamp limits voltages on the drains of the transistors within the rectifier to a desired value by sinking the currents at the drains of the transistors. The active clamp recovers and uses the clamping current to charge the output capacitor.

According to one embodiment, the active clamp includes a first diode, a second diode, a third diode, a fourth diode, a transistor, a first resistor, a second resistor, and a capacitor. The third diode, the fourth diode, and the transistor form a clamping module that implements the active clamp circuit for sinking the clamping current at the drains of the transistors of the rectifier. The first diode, the second diode, the first resistor, the second resistor, and the capacitor form a threshold setting module that sets a threshold for the clamping module.

According to one embodiment, the clamping module utilizes a Darlington Mosfet configuration to increase intervention time of the active clamp. The clamping module in this embodiment includes a transistor, a Zener diode, and a third resistor.

According to one embodiment, the threshold setting module is replaced with a driving module configured to activate the clamping module dynamically. The driving module includes a diode, a capacitor, and a driver.

According to one embodiment, the clamping module includes a p-channel metal oxide semiconductor field effect transistor (MOSFET), and the threshold setting module is removed. The clamping module in this embodiment is dynamically activated by an external voltage.

DETAILED DESCRIPTION

Figure 1:
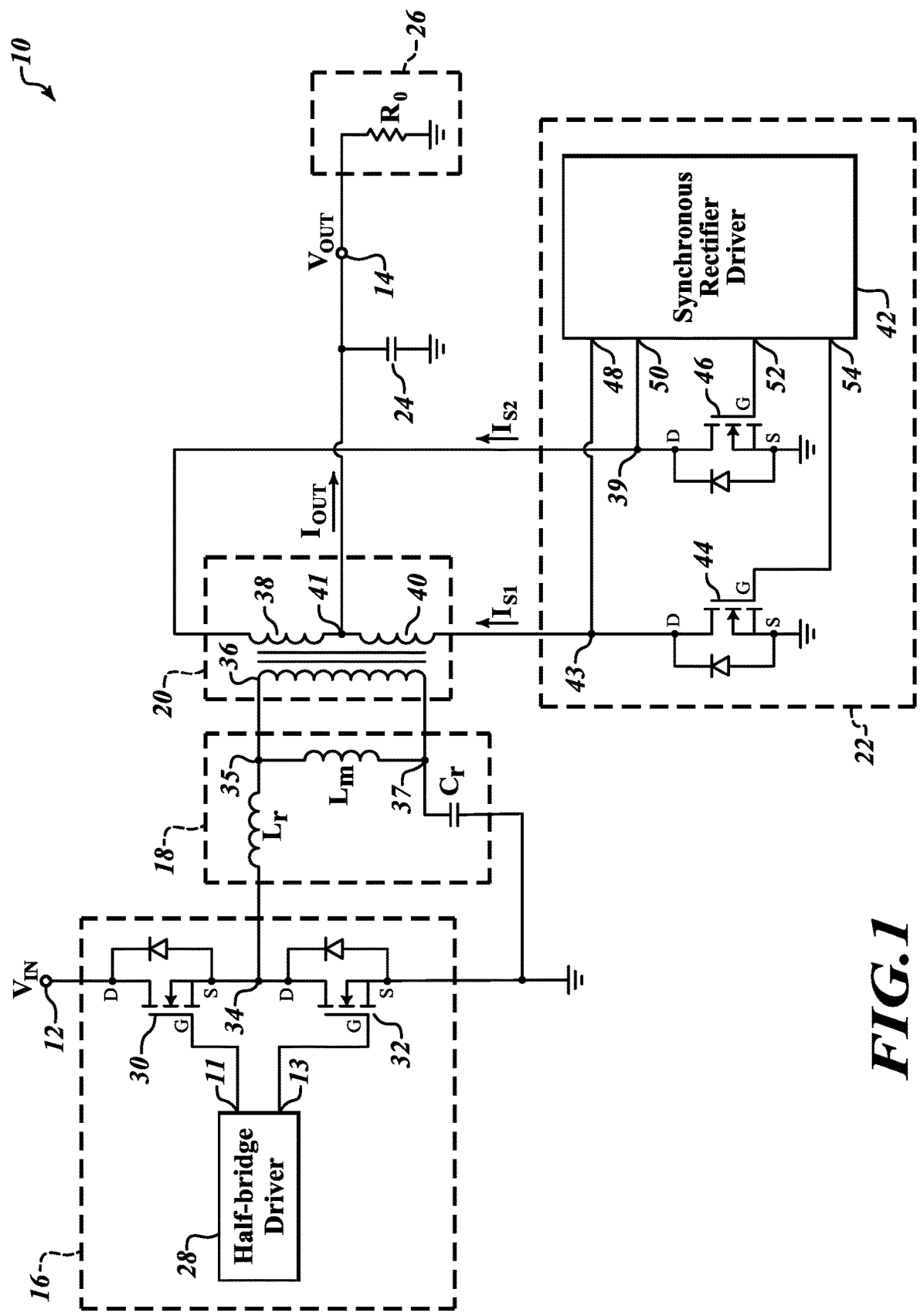
FIG. 1 shows a diagram of a resonant converter, according to one embodiment disclosed herein.

In the following description, certain specific details are set forth in order to provide a thorough understanding of various embodiments of the disclosure. However, one skilled in the art will understand that the disclosure may be practiced without these specific details. In some instances, well-known details associated with resonant converters, rectifiers, and various electronic components, such as transformers, transistors, diodes, capacitors, and inductors, have not been described, to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 shows a block diagram of a resonant converter 10, according to one embodiment disclosed herein. The resonant converter 10 includes an input terminal 12, an output terminal 14, a switch network 16, a resonant tank 18, a transformer 20, a rectifier 22, and an output capacitor 24.

The resonant converter 10 receives an input voltage $V_{IN}$ at the input terminal 12, converts the input voltage $V_{IN}$ to an output voltage $V_{OUT}$, and regulates the output voltage $V_{OUT}$ at the output terminal 14. The resonant converter 10 regulates the output voltage $V_{OUT}$ for a load 26. The load 26 is represented by a resistor $R_O$ in FIG. 1. The load 26 may be any electronic device that is powered by the resonant converter 10.

The input-output gain of the resonant converter 10 is based on the module of the direct transfer function of the resonant converter 10. As resonant converter 10 includes a multi-resonant reactive circuit, the resonant converter 10 is capable of providing a finite gain even at low load.

The resonant converter 10 uses the resonances of circuit capacitances and inductances to achieve soft switching. In particular, the resonant converter 10 is characterized by zero voltage switching (ZVS) on the primary side (i.e., left of the transformer 20 as shown in FIG. 1) of the resonant converter 10, and zero current switching (ZCS) on the secondary side (i.e., right of the transformer 20 as shown in FIG. 1) of the resonant converter 10. By using ZVS and ZCS, the resonant converter 10 is capable of operating at high switching frequencies with high efficiency.

The switch network 16 is coupled to the resonant tank 18. The switch network 16 includes a half-bridge driver 28 and transistors 30, 32. In one embodiment, as shown in FIG. 1, the transistors 30, 32 are metal oxide semiconductor field effect transistors (MOSFETs). The half-bridge driver 28 has a first output 11 and a second output 13. The first output 11 and the second output 13 are electrically coupled to the gate of the transistor 30 and the gate of the transistor 32, respectively. The drain of the transistor 30 is electrically coupled to the input terminal 12. The source of the transistor 30 and the drain of the transistor 32 are electrically coupled to each other. The source of the transistor 32 is electrically coupled to ground.

The switch network 16 is a half bridge. The switch network 16 receives the input voltage $V_{IN}$, generates a square wave using the input voltage $V_{IN}$, and provides the square wave to the resonant tank 18. In one embodiment, the square wave signal generated by the switch network 16 has a frequency that is substantially equal to the resonant frequency of the resonant tank 18. The regulation of the output voltage $V_{OUT}$ is achieved by changing the switching frequency of the square wave.

In order to generate a square wave signal, the half-bridge driver 28 alternates the transistors 30, 32 between a first state and a second state.

In the first state, the half-bridge driver 28 turns the transistor 30 on (i.e., a conducting state) by outputting a high voltage (i.e., a voltage that is greater than a voltage threshold, sometimes referred to as a gate voltage, of the transistor 30) from the first output 11 to the gate of the transistor 30, and turns the transistor 32 off (i.e., a non-conducting state) by outputting a low voltage (i.e., a voltage that is less than a voltage threshold of the transistor 32) from the second output 13 to the gate of the transistor 32. Thus, in the first state, the input voltage $V_{IN}$ is passed through the transistor 30 to a node 34 and supplied to the resonant tank 18.

In the second state, the half-bridge driver 28 turns the transistor 30 off by outputting a low voltage (i.e., a voltage that is less than the voltage threshold of the transistor 30) from the first output 11 to the gate of the transistor 30, and turns the transistor 32 on by outputting a high voltage (i.e., a voltage that is greater than the voltage threshold of the transistor 32) from the second output 13 to the gate of the transistor 32. Thus, in the second state, the input voltage $V_{IN}$ is not passed through the transistor 30 and the node 34 is grounded.

Accordingly, by alternating the transistors 30, 32 between the first state and the second state, the switch network 16 is able generate a square wave signal having a high value that is substantially equal to the input voltage $V_{IN}$ and a low value that is substantially equal to zero volts.

The resonant tank 18 is coupled to the switch network 16 and the transformer 20. The resonant tank 18 includes a first inductor Lr, a second inductor Lm, and a capacitor Cr.

The first inductor Lr, the second inductor Lm, and the capacitor Cr are electrically coupled to each other in series. Namely, the first inductor Lr is electrically coupled between the node 34 and a node 35, the second inductor Lm is electrically coupled between the node 35 and a node 37, and the capacitor Cr is electrically coupled between the node 37 and ground.

The resonant tank 18 receives the square wave signal generated by the switch network 16, and generates a current signal based on the square wave signal. As previously discussed, in one embodiment, the square wave signal generated by the switch network 16 has a frequency that is substantially equal to the resonant frequency of the resonant tank 18. In this embodiment, the resonant tank 18 behaves as a tuned filter, and the current signal generated by the resonant tank 18 is a sinusoidal alternating current (AC) signal formed by the single fundamental harmonic of the Fourier series development.

The transformer 20 is coupled to the resonant tank 18, the rectifier 22, and the output capacitor 24. The transformer 20 includes a first winding 36 on the primary side of the transformer 20; and a first half winding 38 and a second half winding 40 on the secondary side of the transformer 20. The first winding 36 is electrically coupled to the second inductor Lm in parallel. Namely, the first winding 36 is electrically coupled to the node 35 and the node 37. The first and second half windings 38, 40 are electrically coupled to each other in series. In particular, the first half winding 38 is electrically coupled between a node 39 and a node 41, and the second half winding 40 is electrically coupled between the node 41 and a node 43.

The transformer 20 receives the AC signal from the resonant tank 18 on the primary side of the transformer 20 (i.e., left of the transformer 20 as shown in FIG. 1) and transfers the AC signal to the secondary side of the transformer 20 (i.e., right of the transformer 20 as shown in FIG. 1). The voltages generated at the secondary side of the transformer 20 in response to the AC signal depend on the winding ratio of the transformer 20. The secondary voltage ($V_S$) at each of the first and second half windings 38, 40 may be calculated using equation (1):

$$V_S = V_P \cdot \frac{N_S}{N_P} \quad (1)$$

where the first winding 36 has $N_P$ number of turns, the first and second half windings 38, 40 each have $N_S$ number of turns, and the primary voltage at the first winding 36 is equal to $V_P$. In one embodiment, the winding ratio of turns $N_S$ to $N_P$ is selected such that, in a steady state condition, the secondary voltage $V_S$ allows an alternating circulating current in each of the first and second half windings 38, 40.

The rectifier 22 is coupled to the transformer 20 and the output capacitor 24. The rectifier 22 includes a synchronous rectifier driver 42 and transistors 44, 46. In one embodiment, as shown in FIG. 1, the transistors 44, 46 are MOSFETs. The synchronous rectifier driver 42 includes a first input 48, a second input 50, a first output 52, and a second output 54. The first input 48 is electrically coupled to the node 43, the second input 50 is electrically coupled to the node 39, the first output 52 is electrically coupled to the gate of the transistor 46, and the second output 54 is electrically coupled to the gate of the transistor 44. The drain of the transistor 44 is electrically coupled to the node 43, and the source of the transistor 44 is electrically coupled to ground. The drain of the transistor 46 is electrically coupled to the node 39, and the source of the transistor 46 is electrically coupled to the ground.

The rectifier 22 receives the AC signal from the secondary side of the transformer 20, converts the AC signal to a direct current (DC) signal, and provides the DC signal to the output capacitor 24 through node 41. The rectifier 22 converts the AC signal to the DC signal by fixing the direction of the current in a single direction. In particular, the rectifier 22 fixes the direction of current in the direction as indicated by currents $I_{S1}$, $I_{S2}$, and $I_{OUT}$ shown in FIG. 1. In order to fix the direction of current and convert the AC signal to the DC signal, the synchronous rectifier driver 42 controls the transistors 44, 46 to emulate ideal diodes by turning the transistors 44, 46 on (i.e., a conducting state) or off (i.e., a non-conducting state) based on whether the first and second half windings 38, 40 are conducting.

As previously discussed, the transformer 20 receives the AC signal from the resonant tank 18 on the primary side of the transformer 20 and transfers the AC signal to the secondary side of the transformer 20. As a result, the AC signals on the first and second half windings 38, 40 will be 180 degrees out of phase with each other and alternate between first and second cycles. In the first cycle, the AC signal on the first half winding 38 will be high and the AC signal on the second half winding 40 will be low. Conversely, in the second cycle, the AC signal on the first half winding 38 will be low and the AC signal on the second half winding 40 will be high.

In the first cycle (i.e., when the AC signal on the first half winding 38 is low), the synchronous rectifier driver 42 turns the transistor 46 on by outputting a high voltage (i.e., a voltage that is greater than a voltage threshold, often referred to as a gate voltage, of the transistor 46) from the first output 52 to the gate of the transistor 46 and turns the transistor 44 off by outputting a low voltage (i.e., a voltage that is less than a voltage threshold of the transistor 44) from the second output 54 to the gate of the transistor 44. As a result, when the first half winding 38 is conducting, the current $I_{S2}$ is able to flow through the transistor 46, the first half winding 38, and the node 41, and out to the output capacitor 24.

Similarly, in the second cycle (i.e., the AC signal on the second half winding 40 will be low), the synchronous rectifier driver 42 turns the transistor 44 on by outputting a high voltage (i.e., a voltage that is greater than the voltage threshold of the transistor 44) from the second output 54 to the gate of the transistor 44 and turns the transistor 46 off by outputting a low voltage (i.e., a voltage that is less than the voltage threshold of the transistor 46) from the first output 52 to the gate of the transistor 46. As a result, when the second half winding 40 starts conducting, the current $I_{S1}$ is able to flow through the transistor 44, the second half winding 40, and the node 41, and out to the output capacitor 24.

In one embodiment, the synchronous rectifier driver 42 determines when the half windings 38, 40 start conducting based on whether the body diodes of the transistors 44, 46 are conducting. The synchronous rectifier driver 42 determines that the second half winding 40 starts conducting when a current is sensed at the first input 48. Similarly, the synchronous rectifier driver 42 determines that the first half winding 38 starts conducting when a current is sensed at the second input 50.

By using the transistors 44, 46 instead of diodes, efficiency of the rectifier 22 is improved as the synchronous rectifier driver 42 is able to control the transistors 44, 46 to minimize the channel conduction time of transistors 44, 46.

The output capacitor 24 is coupled to the transformer 20 and the rectifier 22. In particular, the output capacitor 24 is electrically coupled to the node 48.

The output capacitor 24 receives and stores the current $I_{OUT}$ from the rectifier 22, and provides the output voltage $V_{OUT}$ at the output terminal 14. The output capacitor 24 ensures that the output voltage $V_{OUT}$ remains stable and properly regulated for the load 26.

As previously discussed, the synchronous rectifier driver 42 turns the transistors 44, 46 on or off based on whether the first and second half windings 38, 40 are conducting. As a result, when the resonant converter 10 is in a steady state condition (i.e., when the output capacitor 24 is fully charged), the voltages at the drains of the transistors 44, 46 will alternate between a high state and a low state. In the first cycle (i.e., when the transistor 44 is off and the transistor 46 is on), the voltages at the drains of the transistor 44 ($V_{DVS44}$) and the transistor 46 ($V_{DVS46}$) may be calculated using equations (2) and (3):

$$V_{DVS44} = 2 \cdot V_{OUT} \quad (2)$$

$$V_{DVS46} = 0 \quad (3)$$

Similarly, in the second cycle (i.e., when the transistor 44 is on and the transistor 46 is off), the voltages at the drains of the transistor 44 ($V_{DVS44}$) and the transistor 46 ($V_{DVS46}$) may be calculated using equations (4) and (5):

$$V_{DVS44} = 0 \quad (4)$$

$$V_{DVS46} = 2 \cdot V_{OUT} \quad (5)$$

A potential problem with using the transistors 44, 46 and the synchronous rectifier driver 42 is that a voltage spike may be generated at the drains of the transistors 44, 46 when the transistors 44, 46 are turned off. When a voltage spike $V_{SPIKE}$ is present, the voltages at the drains of the transistors 44, 46 may be calculated using equation (6):

$$V_{DVS44} = V_{DVS46} = 2 \cdot V_{OUT} + V_{SPIKE} \quad (6)$$

The voltage spikes are sometimes caused by current inversion. For example, when one of the transistors 44, 46 has a delayed turn-off, the current circulating in the secondary side of the transformer 20 may be inverted. Due to the transformer 20 coupling and to parasitic devices in the secondary side of the transformer 20, a voltage spike may be generated. Voltage spikes may also be generated due to the resonant converter 10 working above resonance. When the resonance converter 10 is working above resonance, a voltage spike may be generated due to, for example, current circulating in the body diodes of the transistors 44, 46, to parasitic devices, and to the transformer 20 coupling. The voltage spikes generated on the drains of the transistors 44, 46 are dangerous and may sometimes damage the resonant converter 10.

Figure 2:
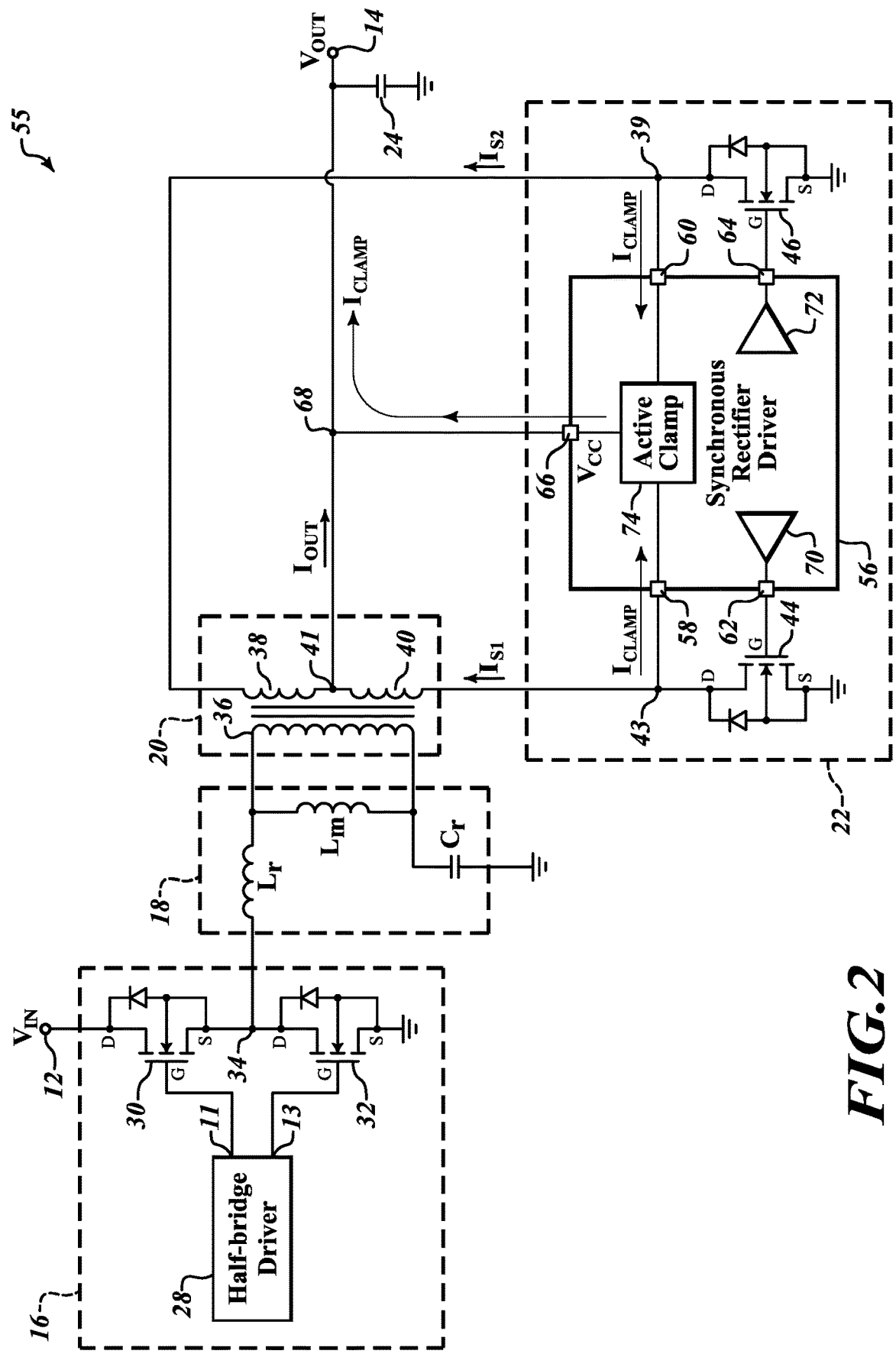
FIG. 2 shows a diagram of a resonant converter including a synchronous rectifier driver with an active clamp, according to one embodiment disclosed herein.

In order to reduce voltage spikes on the drains of the transistors 44, 46, the synchronous rectifier driver 42 of FIG. 1 is replaced with a synchronous rectifier driver with an active clamp. FIG. 2 shows a diagram of a resonant converter 55 including a rectifier 22 including a synchronous rectifier driver 56 with an active clamp 74.

Similar to the resonant converter 10, the resonant converter 55 includes the input terminal 12, the output terminal 14, the switch network 16, the resonant tank 18, the transformer 20, the rectifier 22, and the output capacitor 24. However, in contrast to the resonant converter 10, the rectifier 22 includes the synchronous rectifier driver 56 with the active clamp 74. The synchronous rectifier driver 56 includes a first input 58, a second input 60, a first output 62, a second output 64, a third output 66, first and second gate drivers 70, 72, and the active clamp 74.

The first input 58 is electrically coupled to the node 43, and the second input 60 is electrically coupled to the node 39. The first output 62 is electrically coupled to the gate of the transistor 44, the second output 64 is electrically coupled to the gate of the transistor 46, and the third output 66 is electrically coupled to the node 68.

The first and second gate drivers 70, 72 control the transistors 44, 46 as discussed with respect to the synchronous rectifier driver 42 of FIG. 1. In particular, the first and second gate drivers 70, 72 control the transistors 44, 46 to emulate ideal diodes by turning the transistors 44, 46 on or off based on whether the first and second half windings 38, 40 are conducting. When the second half winding 40 starts conducting, the first gate driver 70 turns the transistor 44 on by outputting a high voltage from the first output 62 to the gate of the transistor 44 and the second gate driver 72 turns the transistor 46 off by outputting a low voltage from the second output 64 to the gate of the transistor 46. As a result, when the second half winding 40 starts conducting, a current $I_{S1}$ is able to flow through the transistor 44, the second half winding 40, and the node 41, and out to the output capacitor 24. Similarly, when the first half winding 38 starts conducting, the second gate driver 72 turns the transistor 46 on by outputting a high voltage from the second output 64 to the gate of the transistor 46 and the first gate driver 70 turns the transistor 44 off by outputting a low voltage from the first output 62 to the gate of the transistor 44. As a result, when the first half winding 38 is conducting, a current $I_{S2}$ is able to flow through the transistor 46, the first half winding 38, and the node 41, and out to the output capacitor 24.

The active clamp 74 limits voltages on the drains of the transistors 44, 46 to a desired value by clamping currents being sunk at the drains of the transistors 44, 46. The active clamp 74 clamps currents at the drains of the transistors 44, 46 by sinking the current at nodes 43, 39. When the current $I_{S1}$ flows through the transistor 44, the active clamp 74 sinks a clamping current $I_{CLAMP}$ from the node 43 into the first input 58. Similarly, when the current $I_{S2}$ flows through the transistor 46, the active clamp 74 sinks the current $I_{CLAMP}$ from the node 39 into the second input 60. By sinking the clamping current at the drains of the transistors 44, 46, the active clamp 74 is able to reduce any voltage spikes at the drains of the transistors 44, 46.

The active clamp 74 also recovers and uses the clamping current $I_{CLAMP}$ to charge the output capacitor 24. The active clamp 74 recovers the clamping current $I_{CLAMP}$ by sinking the currents at the drains of the transistors 44, 46 to the third output 66. When the transistor 44 is turned off and immediately after the zero crossing of the current $I_{S1}$, the active clamp 74 recovers the clamping current $I_{CLAMP}$ at the node 43 and outputs the clamping current $I_{CLAMP}$ to the third output 66. Similarly, when the transistor 46 is turned off and immediately after the zero crossing of the current $I_{S2}$ flows, the active clamp 74 recovers the current $I_{CLAMP}$ at the node 39 and outputs the clamping current $I_{CLAMP}$ to the third output 66. By sinking the clamping current $I_{CLAMP}$ to the third output 66, any power loss caused by limiting the voltages on the drains of the transistors 44, 46 is recovered and used to charge the output capacitor 24, in addition to the current $I_{OUT}$. As a result, efficiency of the resonant converter 55 is improved.

Figure 3:
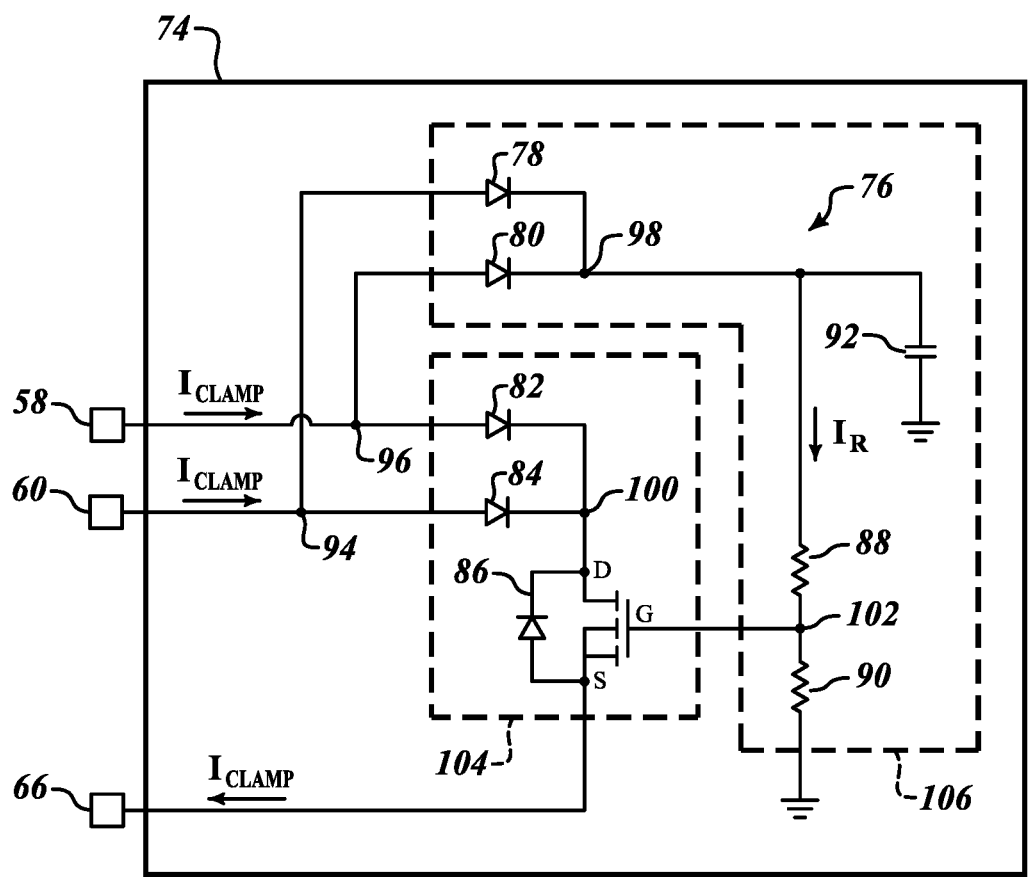
FIG. 3 shows a detailed diagram of an active clamp, according to a first embodiment disclosed herein.

FIG. 3 shows a detailed diagram of the active clamp 74, according to a first embodiment disclosed herein. In the embodiment shown in FIG. 3, the active clamp 74 includes circuitry 76. The circuitry 76 includes a first diode 78, a second diode 80, a third diode 82, a fourth diode 84, a transistor 86, a first resistor 88, a second resistor 90, and a capacitor 92. The first input 58 of the synchronous rectifier driver 56 is electrically coupled to a node 96 of the circuitry 76, the second input 60 of the synchronous rectifier driver 56 is electrically coupled to a node 94 of the circuitry 76, and the third output 66 of the synchronous rectifier driver 56 is electrically coupled to a source of the transistor 86.

The first diode 78 is electrically coupled between the node 94 and a node 98, the second diode 80 is electrically coupled between the node 96 and the node 98, the third diode 82 is electrically coupled between the node 96 and a node 100, and the fourth diode 84 is electrically coupled between the node 94 and the node 100. A drain of the transistor 86 is electrically coupled to the node 100, a source of the transistor 86 is electrically coupled to the third output 66 of the synchronous rectifier driver 56, and a gate of the transistor 86 is electrically coupled to a node 102. In one embodiment, as shown in FIG. 3, the transistor 86 is an n-channel MOSFET. The first resistor 88 is electrically coupled between the node 98 and the node 102, and the second resistor 90 is electrically coupled between the node 102 and ground. The capacitor 92 is electrically coupled between the node 98 and ground.

The circuitry 76 clamps the voltages at the drains of the transistors 44, 46 and uses the clamping current $I_{CLAMP}$ to charge the output capacitor 24. As a result, voltage spikes at the nodes 43, 39 are reduced and efficiency of the resonant converter 55 is improved. The circuitry 76 is effective when a time constant $R_{88}*C_{GS86}$ is less than the time needed to clamp a voltage spike on the drains of the transistors 44, 46, where $R_{88}$ is the resistance of the first resistor 88 and $C_{GS86}$ is the capacitance between gate and source of the transistor 86.

The circuitry 76 includes a clamping module 104 and a threshold setting module 106. The clamping module 104 includes the third diode 82, the fourth diode 84, and the transistor 86. The threshold setting module 106 includes the first diode 78, the second diode 80, the first resistor 88, the second resistor 90, and the capacitor 92.

The clamping module 104 implements the active clamp circuit for sinking the clamping current $I_{CLAMP}$ at the nodes 39, 43. The transistor 86 is the active element and is designed to set a desired current level for the maximum clamping current $I_{CLAMP}$. As the clamping current $I_{CLAMP}$ is equal to a drain current when the transistor 86 is working in its saturation region ($I_{DSAT}$), it is possible to fix the desired current level for the clamping current $I_{CLAMP}$ by choosing the channel width and length for the transistor 86. In one embodiment, the clamping current is calculated using equations (7) and (8):

$$I_{CLAMP} = I_{DSAT} = K'\frac{W}{L}(V_{GS} - V_{TH86})^2 \cdot (1 + \lambda\, V_{DS86}) \qquad (7)$$

$$K' = \mu \cdot C_{OX} \qquad (8)$$

where W is the channel width of the transistor 86, L is the channel length of the transistor 86, μ (the electron mobility of the transistor 86) is a constant, $C_{OX}$ (the oxide capacitance of the transistor 86) is a constant, $V_{GS}$ is the voltage between the gate and source of the transistor 86, $V_{TH86}$ is a voltage threshold (i.e., gate voltage) of the transistor 86, λ is the resonance frequency of the resonant converter 55, and $V_{DS86}$ is the drain source voltage of the transistor 86. Accordingly, by selecting the channel width and the length of the transistor 86, a desired current level may be selected for the clamping current $I_{CLAMP}$.

The third diode 82 and the fourth diode 84 are included in the clamping module 104 so that a single active component (i.e., the transistor 86) may be used for both the clamping current $I_{CLAMP}$ recovered at the node 43 and the clamping current $I_{CLAMP}$ recovered at the node 39. When the transistor 46 is turned off and a voltage spike is forming at the node 39 immediately after the zero crossing of the current $I_{S2}$, the active clamp 74 recovers the clamping current $I_{CLAMP}$ at the node 39, the clamping current $I_{CLAMP}$ flows through the third diode 82, the transistor 86, and out of the third output 66. Similarly, when the transistor 44 is turned off and a voltage spike is forming at the node 43 immediately after the zero crossing of the current $I_{S1}$, the active clamp 74 recovers the clamping current $I_{CLAMP}$ at the node 43, the clamping current $I_{CLAMP}$ flows through the fourth diode 84, the transistor 86, and out of the third output 66. By using a single transistor 86, the overall area of the circuitry 76 is minimized.

During the clamping by the clamping module 104, the clamping current $I_{CLAMP}$ creates a voltage drop on the third diode 82 or the fourth diode 84. The voltage drop depends on an internal series resistance of the third and fourth diodes 82, 84. A correct design for the circuitry 76 is obtained when the voltage drop compared to $V_{OUT}$ does not limit the drain current. This implies that, for the maximum clamping current, the drain source voltage of the transistor 86 ($V_{DS86}$) is greater than the voltage at the drain of the transistor 86 when the transistor 86 is working in its saturation region.

The threshold setting module 106 limits or sets maximum voltages at the drains of the transistor 44, 46 by controlling the transistor 86. The voltage at the node 98 is based on the rectified peak voltage at the drains of the transistors 44, 46 and the voltage drops on the first and second diodes 78, 80. In the first cycle (i.e., when the transistor 44 is off and the transistor 46 is on), the voltage at the node 98 may be calculated using equation (9):

$$V_{Node98} = V_{DS44} - V_{D80} \qquad (9)$$

where $V_{NODE98}$ is the voltage at the node 98, $V_{DVS44}$ is the voltage at the drain of the transistor 44, and $V_{D80}$ is the voltage drop of the second diode 80. In the second cycle (i.e., when the transistor 44 is on and the transistor 46 is off), the voltage at the node 98 may be calculated using equation (10):

$$V_{Node98} = V_{DS46} - V_{D78} \qquad (10)$$

where $V_{NODE98}$ is the voltage at the node 98, $V_{DVS46}$ is the voltage at the drain of the transistor 46, and $V_{D78}$ is the voltage drop of the first diode 78. The resistances of the first resistor 88 and the second resistor 90 are selected such that a current $I_R$ through the first and second resistors 88, 90 is limited to few milliamps (e.g., 1 to 3 milliamps). As a result, it is possible to neglect the diode resistance voltage drop on the first and second diodes 78, 80. In this condition, the voltage at the node 102 may be calculated using equations (11) and (12):

$$V_{NODE102} = \alpha \cdot V_{NODE98} \qquad (11)$$

$$\alpha = \frac{R_{90}}{R_{88} + R_{90}} \qquad (12)$$

where $V_{NODE102}$ is the voltage at the node 102, $R_{88}$ is the resistance of the first resistor 88, and $R_{90}$ is the resistance of the second resistor 90. The gate source voltage of the transistor 86 may then be calculated using equation (13):

$$V_{GS86} = V_{NODE102} - V_{OUT} = V_{OUT}(2\alpha - 1) + \alpha \cdot (V_{MAX} - V_{D78,80}) \qquad (13)$$

where $V_{GS86}$ is the gate source voltage of the transistor 86, and $V_{MAX}$ is the maximum voltage level at the drains of the transistors 44, 46. As the transistor 86 starts conducting when the voltage between the gate and source of the transistor 86 ($V_{GS86}$) is equal to a voltage threshold (i.e., gate voltage) of the transistor 86, the maximum voltage at the drain of the transistor 44 may be calculated using equation (14):

$$V_{MAX} = \frac{V_{TH86}}{\alpha} + V_{D80} - \frac{2\alpha - 1}{\alpha} \cdot V_{OUT} \qquad (14)$$

Similarly, the maximum voltage at the drain of the transistor 46 may be calculated using equation (15):

$$V_{MAX} = \frac{V_{TH86}}{\alpha} + V_{D78} - \frac{2\alpha - 1}{\alpha} \cdot V_{OUT} \qquad (15)$$

Figure 4:
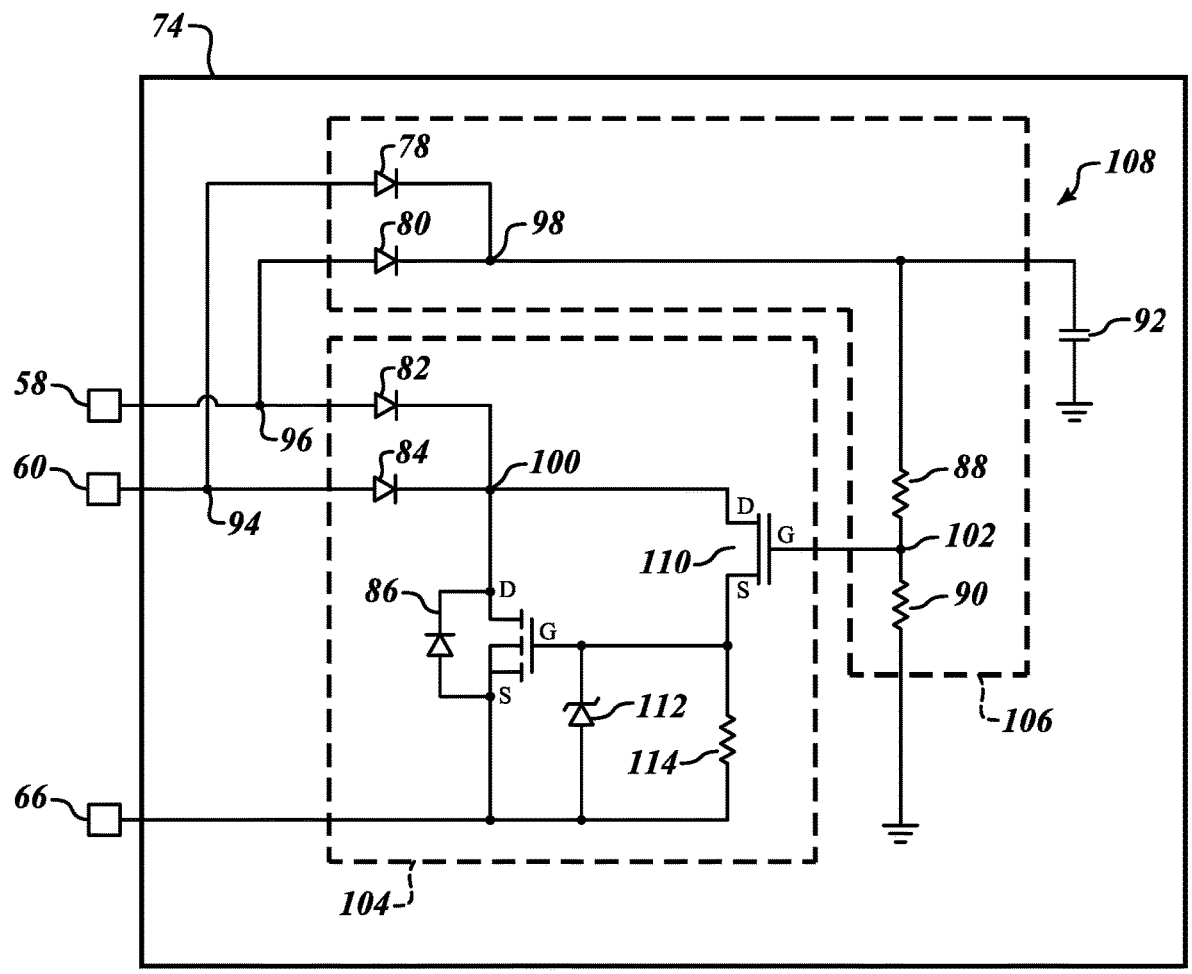
FIG. 4 shows a detailed diagram of an active clamp, according to a second embodiment disclosed herein.

As previously discussed, the circuitry 76 is effective when a time constant $R_{88}*C_{GS86}$ is less than the time needed to clamp a voltage spike on the drains of the transistors 44, 46, where $R_{88}$ is the resistance of the first resistor 88 and $C_{GS86}$ is the capacitance between gate and source of the transistor 86. In cases where the time constant $R_{88}*C_{GS86}$ is higher than the time needed to clamp a voltage spike on the drains of the transistors 44, 46, an active clamp that allows fast intervention time may be used. FIG. 4 shows a detailed diagram of the active clamp 74, according to a second embodiment disclosed herein. In the second embodiment, the active clamp 74 includes circuitry 108. Similar to the circuitry 76 shown in FIG. 3, the circuitry 108 includes the first diode 78, the second diode 80, the third diode 82, the fourth diode 84, the transistor 86, the first resistor 88, the second resistor 90, and the capacitor 92. However, in contrast to the circuitry 76, the circuitry 108 utilizes a Darlington Mosfet configuration in order to reduce the time constant $R_{88}*C_{GS86}$. The circuitry 108, specifically the clamping module 104, includes a transistor 110, a Zener diode 112, and a third resistor 114.

A drain of the transistor 110 is electrically coupled to the node 100, a gate of the transistor 110 is electrically coupled to the node 102, and a source of the transistor 110 is electrically coupled to the gate of the transistor 86. The Zener diode 112 is electrically coupled between the gate of the transistor 86 and the third output 66 of the synchronous rectifier driver 56. The third resistor 114 is electrically coupled between the gate of the transistor 86 and the third output 66 of the synchronous rectifier driver 56.

In order to reduce the time constant $R_{88}*C_{GS86}$, a transistor having a small channel width is used for the transistor 110. Namely, the channel width of the transistor 110 is selected to be smaller than the channel width of the transistor 86. By using a smaller channel width for the transistor 110, it is possible to reduce the capacitance between the gate and source of the transistor 86 (i.e., $C_{GS86}$). As a result, the circuitry 108 has a faster clamp intervention time compared to the circuitry 76. In addition, the capacitances between the gates and drains of the transistors 86, 110 help to increase the speed of clamp intervention.

Figure 5:
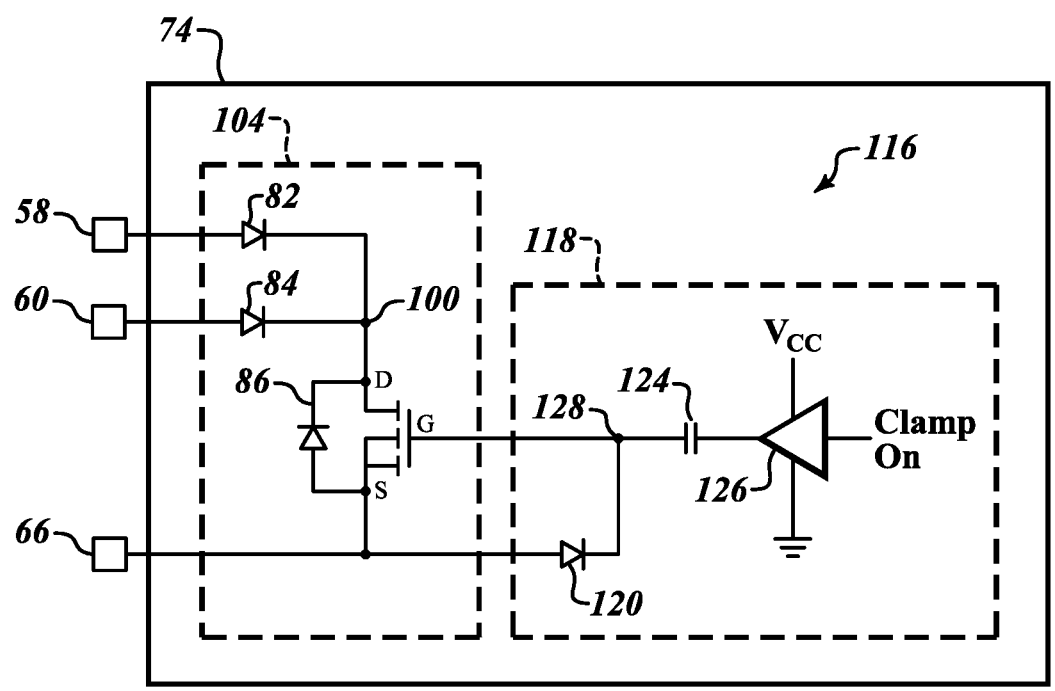
FIG. 5 shows a detailed diagram of an active clamp, according to a third embodiment disclosed herein.

For applications in which the voltages at the drains of the transistor 44, 46 ($V_{DVS44}$, $V_{DVS46}$) have very fast commutation times, the clamping module 104 of the active clamp 74 may be activated dynamically using a driving module. FIG. 5 shows a detailed diagram of the active clamp, according to a third embodiment disclosed herein. In the embodiment shown in FIG. 5, the active clamp 74 includes circuitry 116. Similar to the circuitry 76 shown in FIG. 3, the circuitry 116, specifically the clamping module 104, includes the third diode 82, the fourth diode 84, and the transistor 86. However, in contrast to the circuitry 76, the threshold setting module 106 is replaced with a driving module 118.

The driving module 118 includes a diode 120, a capacitor 124, and a driver 126. The gate of the transistor 86 is electrically coupled to a node 128. The diode 120 is electrically coupled between the node 128 and the third output 66 of the synchronous rectifier driver 56. The capacitor 124 is electrically coupled between the node 128 and the driver 126. The driver 126 is electrically coupled to the capacitor 124 and ground. The driver 126 receives a power supply VCC and a Clamp On signal.

The driving module 118 activates the clamping module 104 dynamically based on the Clamp On signal. In particular, the driving module 118 deactivates the clamping module 104 when the Clamp On signal is low, and activates the clamping module 104 when the Clamp On signal is high. The clamping module 104 sinks the clamping current $I_{CLAMP}$ when the clamping module 104 is activated, and does not sink the clamping current $I_{CLAMP}$ when the clamping module 104 is deactivated.

When the Clamp On signal is low, the driver 126 outputs a low driving signal (i.e., a voltage that is less than a voltage threshold of the transistor 86) to the capacitor 124. As a result, the transistor 86 will be off (i.e., not conducting), and the transistor 86 will not sink the clamping current $I_{CLAMP}$. The voltage of the capacitor 124 ($V_{C124}$) when the driving signal is low may be calculated using equation (16):

$$V_{C124}=V_{OUT}-V_{D120} \quad (16)$$

where $V_{D120}$ is the voltage drop on the diode 120.

When the Clamp On signal is high, the driver 126 outputs a high driving signal equal to the power supply VCC to the capacitor 124. In one embodiment, the power supply VCC is greater than a voltage threshold of the transistor 86. As a result, the transistor 86 will be on (i.e., conducting), and the transistor 86 will sink the clamping current $I_{CLAMP}$ and limit the voltages at the drains of the transistor 44, 46. When the driving signal is high, the voltage of the capacitor 124 ($V_{C124}$) may be calculated using equation (17):

$$V_{C124}=V_{OUT}-V_{D120}+VCC \quad (17)$$

Figure 6:
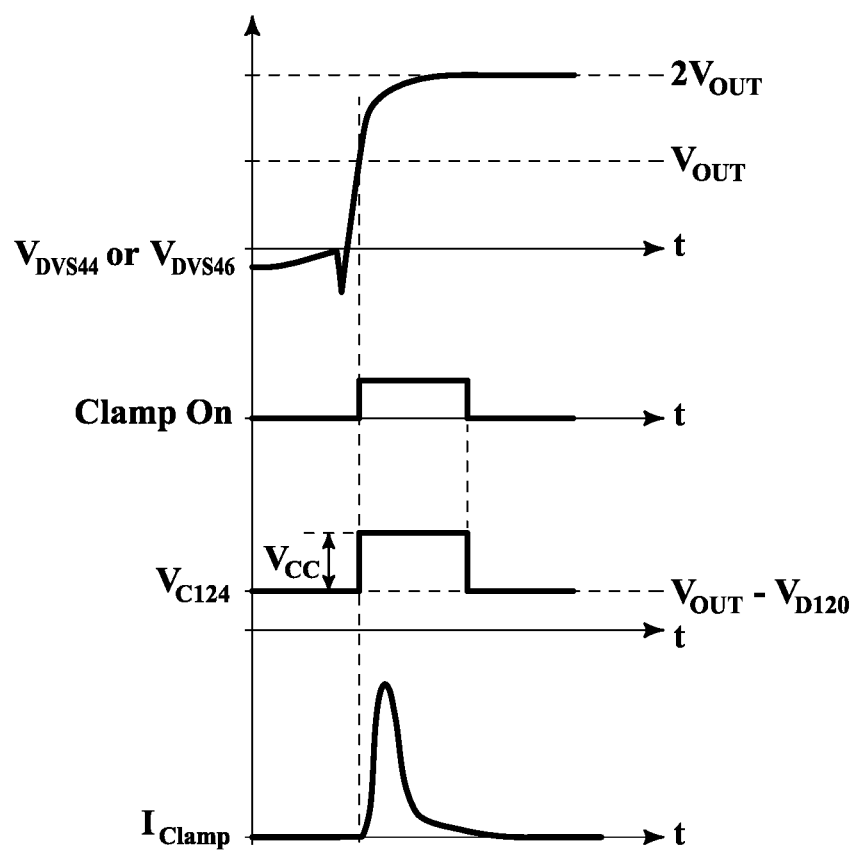
FIG. 6 shows a diagram of waveforms of the active clamp of FIG. 5, according to one embodiment disclosed herein.

In one embodiment, the clamping module 104 is activated at a rising edge of the voltage signals at the drains of the transistors 44, 46 ($V_{DVS44}$, $V_{DVS46}$). FIG. 6 shows a diagram of waveforms of the active clamp 74 of FIG. 5, according to one embodiment disclosed herein.

As shown in FIG. 6, when the voltage signal at the drain of the transistor 44 ($V_{DVS44}$) is low, the Clamp On signal is low. Similarly, when the voltage signal at the drain of the transistor 46 ($V_{DVS46}$) is low, the Clamp On signal is low. As previously discussed, when the Clamp On signal is low, the voltage of the capacitor 124 ($V_{C124}$) is equal to the voltage calculated by equation (16). As a result, the transistor 86 is open (i.e., not conducting), and the clamping current $I_{CLAMP}$ is equal to zero.

When the voltage signal at the drain of the transistor 44/46 ($V_{DVS44}/V_{DVS46}$) transitions from low to high, the Clamp On signal transitions from low to high during the rising edge. As previously discussed, when the Clamp On signal is high, the voltage of the capacitor 124 ($V_{C124}$) is equal to the voltage calculated by equation (15). As a result, the transistor 86 is closed (i.e., conducting) and begins sinking the clamping current $I_{CLAMP}$. In one embodiment, the Clamp On signal remains high for predetermined amount of time in order to avoid loss of power.

Figure 7:
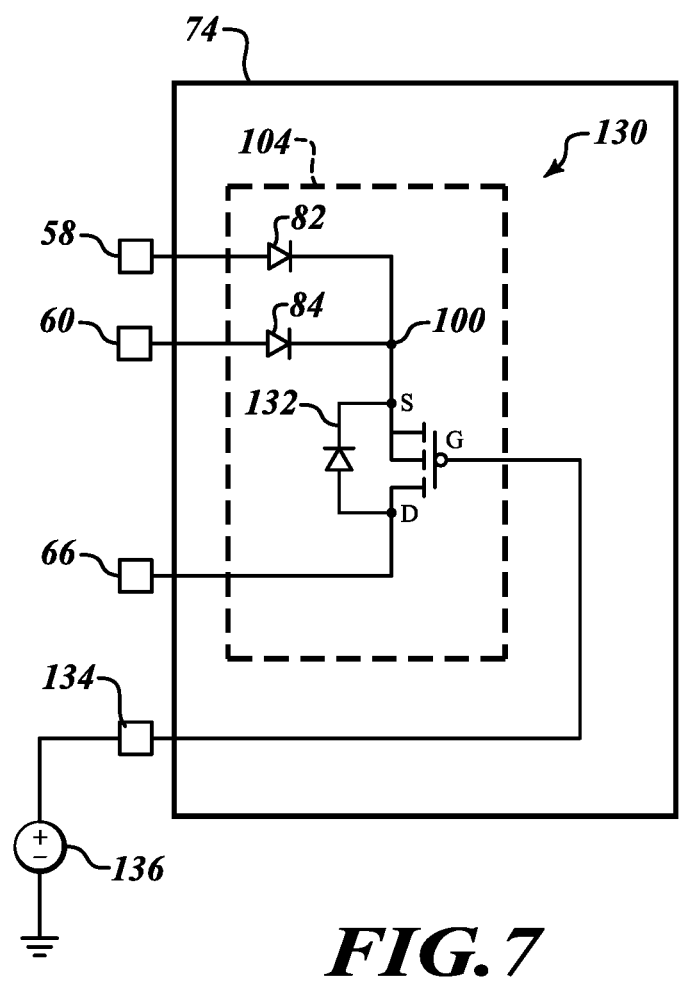
FIG. 7 shows a detailed diagram of an active clamp, according to a fourth embodiment disclosed herein.

FIG. 7 shows a detailed diagram of an active clamp, according to a fourth embodiment disclosed herein. In the fourth embodiment, the active clamp 74 includes circuitry 130. Similar to the circuitry 76 shown in FIG. 3, the circuitry 130, specifically the clamping module 104, includes the third diode 82 and the fourth diode 84. However, in contrast to the circuitry 76, the transistor 86 is replaced with a transistor 132. In one embodiment, as shown in FIG. 7, the transistor 132 is a p-channel MOSFET. In addition, the threshold setting module 106 is removed, and the synchronous rectifier driver 56 includes a third input 134 that is electrically coupled to a gate of the transistor 132.

The third diode 82 is electrically coupled between the first input 58 of the synchronous rectifier driver 56 and the node 100, and the fourth diode 84 is electrically coupled between the first input 58 of the synchronous rectifier driver 56 and the node 100. A source of the transistor 86 is electrically coupled to the node 100, a drain of the transistor 132 is electrically coupled to the third output 66 of the synchronous rectifier driver 56, and the gate of the transistor 132 is electrically coupled to the third input 134 of the synchronous rectifier driver 56.

The circuitry 130 allows the clamping module 104 to be dynamically activated by an external voltage $V_{ext}$. The clamping module 104 is activated by applying the external voltage $V_{ext}$ to the gate of the transistor 132 via the third input 134. The activation and deactivation of the clamping module 104 is based on the voltage threshold (i.e., gate voltage) of the transistor 132. When the difference between the voltage at the node 100 and the external voltage $V_{ext}$ is greater than the voltage threshold of the transistor 132, the transistor 132 will conduct and sink the clamping current $I_{CLAMP}$ to the third output 66. Conversely, when the difference between the voltage at the node 100 and the external voltage $V_{ext}$ is less than the voltage threshold of the transistor 132, the transistor 132 will not conduct, and, thus, the clamping current $I_{CLAMP}$ will not sink to the third output 66.

In the fourth embodiment, the maximum voltage at the drain of the transistor 44 may be calculated using equation (18):

$$V_{DVS44}=V_{ext}+V_{TH132}+V_{D82} \qquad (18)$$

where $V_{DVS44}$ is the voltage at the drain of the transistor 44, $V_{ext}$ is the external voltage applied at the third input 134, $V_{TH132}$ is a voltage threshold of the transistor 132, and $V_{D82}$ is the voltage drop on the third diode 82. Similarly, the maximum voltage at the drain of the transistor 46 may be calculated using equation (19):

$$V_{DVS46}=V_{ext}+V_{TH132}+V_{D84} \qquad (19)$$

where $V_{DVS46}$ is the voltage at the drain of the transistor 46, $V_{ext}$ is the external voltage applied at the third input 134, $V_{TH132}$ is a voltage threshold of the transistor 132, and $V_{D84}$ is the voltage drop on the fourth diode 84.

In one embodiment, the external voltage $V_{ext}$ is set to be twice the output voltage $V_{OUT}$. The external voltage $V_{ext}$ may be calculated using equation (20):

$$V_{ext}=2 \cdot V_{OUT} \qquad (20)$$

In this embodiment, the maximum voltage at the drain of the transistor 44 may be calculated using equation (21):

$$V_{DVS44}=2 \cdot V_{OUT}+V_{TH132}+V_{D82} \qquad (21)$$

where $V_{TH132}$ is a voltage threshold of the transistor 132, and $V_{D82}$ is the voltage drop on the third diode 82. Similarly, the maximum voltage at the drain of the transistor 46 may be calculated using equation (22):

$$V_{DVS46}=2 \cdot V_{OUT}+V_{TH132}+V_{D84} \qquad (22)$$

where $V_{TH132}$ is a voltage threshold of the transistor 132, and $V_{D82}$ is the voltage drop on the fourth diode 84, and $V_{OUT}$ is the output voltage.

In one embodiment, the third input 134 is electrically coupled to an external voltage reference 136. The external voltage reference 136 ensures that external voltage $V_{ext}$ remains stable and properly regulated to drive the gate of the transistor 132.

It should be noted that, although the present application discusses the synchronous rectifier driver 56 in conjunction with the resonant converter 55, the synchronous rectifier driver 56 may be used for other devices that suffer from voltage spikes at particular nodes or pins.

In accordance with one or more embodiments, the synchronous rectifier driver 56 provides a low-cost solution to reduce voltage spikes at the drains of the transistors 44, 46 of the resonant converter 55. The synchronous rectifier driver 56 also increases efficiency of the resonant converter 55 by recovering the clamping current $I_{CLAMP}$ to charge the output capacitor 24.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A resonant converter, comprising:
an output terminal;
a transformer including a first winding;
a rectifier including:
a first transistor having a drain, a gate, and a source, the source of the first transistor being grounded, the first winding being coupled between the drain of the first transistor and the output terminal;
a first driver configured to provide a first driving signal to the gate of the first transistor; and
an active clamp configured to receive a first current from the drain of the first transistor, and output a second current based on the first current to the output terminal, the active clamp including:
a second transistor having a drain, a gate, and a source, the source of the second transistor being electrically coupled to the output terminal;
a first diode coupled between the drain of the first transistor and the drain of the second transistor;
a second diode having an anode and a cathode, the anode of the second diode being electrically coupled to the source of the second transistor and the output terminal, the cathode of the second diode being electrically coupled to the gate of the second transistor;
a first capacitor electrically coupled to the gate of the second transistor and the cathode of the second diode; and
a second driver electrically coupled to the first capacitor.

2. The resonant converter of claim 1, further comprising:
a second capacitor coupled between the output terminal and ground, the second capacitor configured to receive the second current.

3. The resonant converter of claim 1 wherein the transformer includes a second winding, and the rectifier includes:
a third transistor having a drain, a gate, and a source, the source of the third transistor being grounded, the second winding being coupled between the first winding and the drain of the third transistor; and
a second driver configured to provide a second driving signal to the gate of the third transistor.

4. The resonant converter of claim 3 wherein the active clamp is configured to receive a third current from the drain of the third transistor, and output a fourth current based on the third current to the output terminal.

5. The resonant converter of claim 3 wherein the active clamp includes:
a second diode coupled between the drain of the third transistor and the second transistor.

6. A device, comprising:
an output terminal;
a transformer electrically coupled to the output terminal;
a rectifier including:
a first transistor having a drain, a gate, and a source, the source of the first transistor being grounded;
a second transistor having a drain, a gate, and a source, the source of the second transistor being grounded, the transformer being coupled between the drain of the first transistor and the drain of the second transistor;
a first driver, which, in operation, provides a first driving signal to the gate of the first transistor;

a second driver, which, in operation, provides a driving signal to the gate of the second transistor; and an active clamp including:
  a first input terminal electrically coupled to the drain of the first transistor;
  a second input terminal electrically coupled to the drain of the second transistor;
  a third transistor having a drain, a gate, and a source, the source of the third transistor being electrically coupled to the output terminal;
  a first diode coupled between the first input terminal and the drain of the third transistor;
  a second diode coupled between the second input terminal and the drain of the third transistor;
  a third diode coupled between the source of the third transistor and the gate of the third transistor;
  a first capacitor electrically coupled to the gate of the third transistor and the second diode; and
  a third driver electrically coupled to the first capacitor.

7. The device of claim 6 wherein
the active clamp, in operation, receives a first current from the drain of the first transistor via the first input terminal, and provides a second current based on the first current to the output terminal, and
the active clamp, in operation, receives a third current from the drain of the second transistor via the second input terminal, and provides a fourth current based on the third current to the output terminal.

8. The device of claim 6, further comprising:
a capacitor coupled between the output terminal and ground.

9. A device, comprising: an output terminal; a first transistor having a drain, a gate, and a source, the source of the first transistor being grounded; a second transistor having a drain, a gate, and a source, the source of the second transistor being grounded; a first driver configured to provide a first driving signal to the gate of the first transistor; a second driver configured to provide a second driving signal to the gate of the second transistor; and an active clamp including: a third transistor having a drain, a gate, and a source, the source of the third transistor being electrically coupled to the output terminal; a first diode coupled between the first transistor and the drain of the third transistor; a second diode coupled between the second transistor and the drain of the third transistor; a third diode having an anode and a cathode, the anode of the third diode being electrically coupled to the source of the third transistor and the output terminal, the cathode of the third diode being electrically coupled to the gate of the third transistor; a first capacitor electrically coupled to the gate of the third transistor and the cathode of the third diode; and a third driver electrically coupled to the first capacitor.

10. The device of claim 9, further comprising:
a second capacitor coupled between the output terminal and ground.

11. The device of claim 6 wherein the transformer includes a first winding and a second winding, and the output terminal is electrically coupled to the first winding and the second winding.

12. The device of claim 9, further comprising:
a transformer coupled between the drain of the first transistor and the drain of the second transistor.

13. The device of claim 12 wherein the transformer includes a first winding and a second winding, and the output terminal is electrically coupled to the first winding and the second winding.

* * * * *